Feb. 19, 1935.  H. J. KELLY  1,991,683
AQUARIUM
Filed Jan. 10, 1933
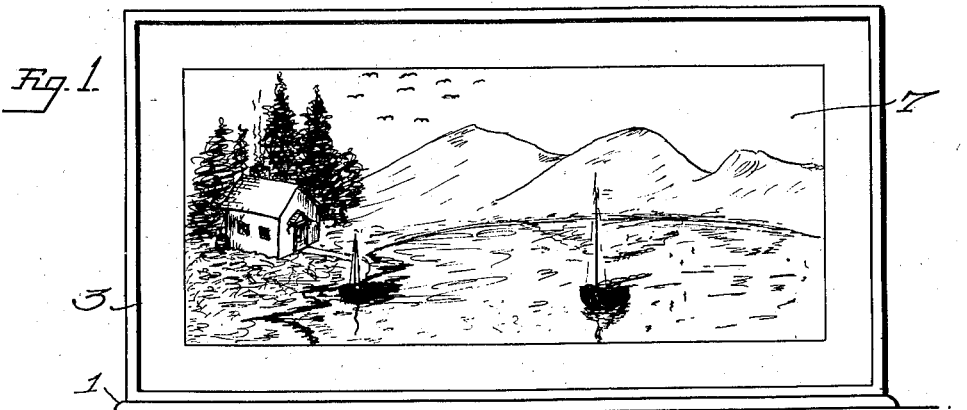
Fig. 1.
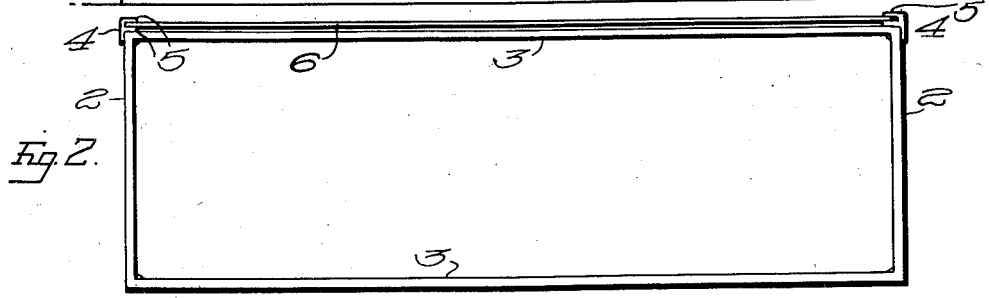
Fig. 2.
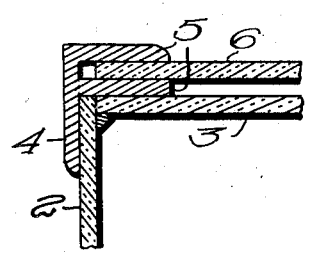
Fig. 3.
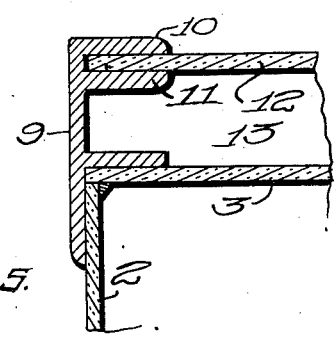
Fig. 5.
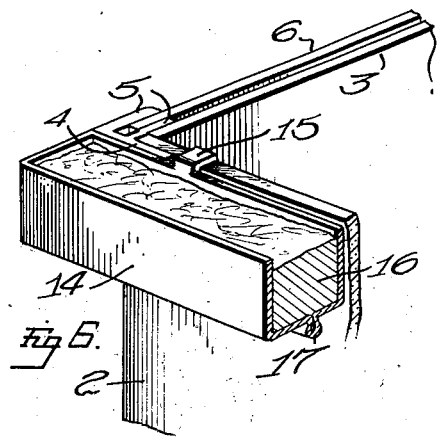
Fig. 6.
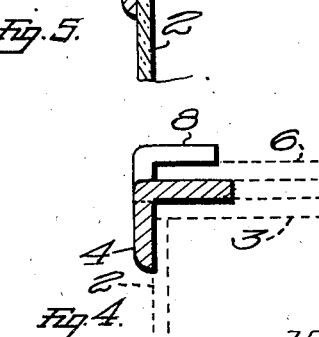
Fig. 4.
Inventor
Harry J. Kelly
By
Attorney Patented Feb. 19, 1935

1,991,683

UNITED STATES PATENT OFFICE 1,991,683

AQUARIUM

Harry J. Kelly, Nashville, Tenn.

Application January 10, 1933, Serial No. 651,051

1 Claim. (Cl. 119—5)

My invention relates to improvements in aquariums, and one object of the invention is the provision of an aquarium which will perform the function of such an article in a thorough manner and in addition will display a picture or other feature of beauty or adornment to make the aquarium more desirable than the aquariums in general use.

Another object of my invention is the provision of an aquarium which will serve its purpose and which will provide the feature of adornment without adding much to the cost, thus making the aquarium much more desired and attractive in the home.

Another object of my invention is the provision of an aquarium which will be of very attractive and ornamental appearance, which will serve its purpose in a practical and thorough manner and which can be sold at the proper price to make it useful, desirable and necessary.

With these objects in view my invention consists of an aquarium embodying novel features of construction and combination of parts, substantially as described and claimed and as shown in the accompanying drawing, in which:

Figure 1 represents a side view of an aquarium constructed in accordance with and embodying my invention as seen through the front glass panel.

Figure 2 represents a top plan view.

Figure 3 represents an enlarged view of one of the inner or rear corners showing the cleat to secure the picture or like article of adornment.

Figure 4 shows a detail view of a modified form of corner in which the picture holding means is struck up from the metal of the corner strips, and Figure 5 shows a further modified form which provides a space or chamber to receive soil in which may be planted a suitable ornamental vine or plant.

Figure 6 is a detail view of another modified construction of my invention.

One of the most important features of my invention is the production of an aquarium which will be of more ornamental and attractive appearance than those in present use and at the same time add very little to the cost and according to my invention the aquarium consists of the base or support 1, the end glass panels 2, the front and rear glass panels 3, and the pair of rear corner strips or angle plates 4, which are formed with cleats or guides 5, in which is fitted a panel 6, ornamented by a picture 7, or other ornamentation which shows through the front glass panel of the aquarium and presents both a novel and a beautiful effect as will be readily understood and appreciated.

In the form of my invention shown in Figure 4, the corner angle strips are provided with struck up clips 8, which hold the picture, while in the form shown in Figure 5, the corner strips are provided with a web 9, formed with ears 10, providing a cleat 11, to receive and retain a panel 12, and this forms the space or chamber 13, in which may be placed dirt or water for the planting of a vine or suitable plant. The front or outer corners of the panels 2 and 3 may be made integral, or they may be secured together in any suitable manner.

From the foregoing description taken in connection with the drawing it will be noted that an aquarium constructed according to my invention will possess merit in point of beauty and usefulness and will prove an article or adornment in the home.

In the form of my invention shown in Figure 6 is provided a trough 14, provided with hooks 15, for hanging it from the end or side panels, and said trough is adapted to receive soil 16, for suitable plants, and is further provided with a drain spout 17, and this form is also provided with the corner piece 4, the cleat 5, and the ornamental panel 6, as in the other forms of my improvement.

I claim:

An aquarium of the character described, comprising a base, a pair of front and rear glass panels and a pair of end panels mounted on said base to form the aquarium, a pair of right angled shaped corner pieces fitting upon the corners of the rear and the two end panels, said corner pieces being formed with an integral cleat, one side of each corner piece extending over and in contact with the outer side of an end panel, and a panel secured in said cleat in parallel relation to the rear glass panel of the aquarium.

HARRY J. KELLY.